United States Patent [19]
Mullaney et al.

[11] 3,824,402
[45] July 16, 1974

[54] DUAL PARAMETER FLOW PHOTOMETRIC APPARATUS AND METHOD

[75] Inventors: Paul F. Mullaney; William T. West, both of Los Alamos, N. Mex.

[73] Assignee: The United States of America as represented by the United States Energy Commission, Washington, D.C.

[22] Filed: June 4, 1973

[21] Appl. No.: 366,892

[52] U.S. Cl.............. 250/565, 250/432, 250/458, 250/574, 356/39, 356/73
[51] Int. Cl....... G01n 21/26, G03b 27/32, G03b 27/60
[58] Field of Search ........... 250/218, 432, 458, 564, 250/565, 574; 356/73, 39

[56] References Cited
UNITED STATES PATENTS
| | | | |
|---|---|---|---|
| 3,662,176 | 5/1972 | Kamentsky et al. | 250/218 |
| 3,672,775 | 6/1972 | Fruengel | 250/218 X |
| 3,705,771 | 12/1972 | Friedman | 250/218 |
| 3,710,933 | 1/1973 | Fulwyler et al. | 356/39 |

*Primary Examiner*—Archie R. Borchelt
*Assistant Examiner*—T. N. Grigsby
*Attorney, Agent, or Firm*—John A. Horan; Robert W. Weig

[57] ABSTRACT

A photometric apparatus and method for measuring light responsive characteristics of appropriately stained biological cells. At least two light responsive characteristics are measured and compared to eliminate spurious light induced noise. More particularly, light scattering produced by the cells and fluorescent light emitted by the cells in response to an incident light beam are detected. Electrical signals are produced in accordance with such fluoresced and scattered light. The fluorescence and scattering signals are then compared to one another to eliminate from an output signal fluorescence signals produced from spurious fluorescence in the solution carrying the cells or debris and scattering signals from scattering produced by cellular debris.

1 Claim, 3 Drawing Figures

DUAL PARAMETER FLOW PHOTOMETRIC APPARATUS AND METHOD

The invention described herein was made in the course of, or under, a contract with the U.S. Atomic Energy Commission.

FIELD OF THE INVENTION

The invention relates to an apparatus and method for photometrically measuring selected characteristics of biological cells and more particularly for measuring light responsive characteristics of such cells and for discriminating signals indicative of such characteristics from spurious signals and noise.

BACKGROUND OF THE INVENTION

In cytology, there is an ever-increasing demand for automatic cell analysis and differentiation. At the present time, screening of cytological material such as for the detection of cancerous or malignant cells is accomplished by a two level screening process. Cells are first prescreened visually by an observer capable of determining which samples apparently contain abnormal cells. The abnormal cell-containing samples are then examined by a trained cytotechnologist or pathologist who makes a final determination as to whether the cells of these samples are indeed cancerous. This method fairly accurately finds cancerous cells but it has a number of disadvantages. First, it is slow, requiring considerable technician time. Second, it is costly due to the human time involved. Third, it is nonquantitative in that the criteria of abnormality are chiefly subjective. Because of the time and cost involved, it is generally not applicable to large populations of individuals.

In addition, since many or most of the cellular specimens examined by a medical laboratory are normal, the level of alertness and interest of those who do the prescreening is difficult to maintain. For example, in cytological examination for uterine cervical carcinoma, 98 percent of the women examined do not have cancer. Thus, personnel turnover may tend to be high and the test results become less quantitative and more costly.

Prior art flow systems such as those disclosed in U.S. Pat. No. 3,710,933 to Fulwyler, et al., U.S. Pat. No. 3,560,754 to Kamentsky, and U.S. Pat. No. 3,675,768 to Sanchez have been applied to the problem in order to provide an automatic method of discriminating and classifying normal and abnormal cells. Flow system analysis, as applied by these prior art systems, allows observation of individual cells as they flow in suspension sequentially through a small detection volume. Large numbers of cells are observed in a short period of time and rapid automatic prescreening procedures are applied. Common parameters used in evaluation of the cells are light absorption by the cells, fluorescence emitted by stained cells in response to light incident thereon, cell produced scattering of the light incident on the cells, and the volume of the particles observed.

It has been determined that a primary difficulty in automatic cellular analysis is that a single parameter is frequently insufficient to quantitatively differentiate between normal and abnormal cells. Thus, many of the prior art apparatus and methods such as those above mentioned provide multi-parameter analysis which capably distinguishes abnormal cells from normal cells as well as different types of cells from one another. For example, a particularly useful application is the analysis of fluorescent signals from weakly stained samples.

Although the apparatus and techniques revealed in these patents are commendable and highly efficient, being far superior to the manual process above described, the need for improvements to be applied to such apparatus and methods is evident because these multi-parameter analysis prior art devices provide no satisfactory way of comparing one parameter value with another to eliminate noise or spurious signals and to verify results.

SUMMARY OF THE INVENTION

In accordance with the invention, there is provided an apparatus and method for multi-parameter photometric analysis of biological cells. In particular, the invention provides for multiparameter signal comparison to eliminate noise and spurious light induced signals in the output signal of such a device. At least two parameters, such as cell caused light scattering and fluorescence in response to incident light, are received by light responsive detectors. The detectors produce electrical signals in accordance with preselected characteristics of the detected light. The values and coincidence of these signals are compared at a gate. When signals representative of the two parameters are in accordance with one another, the gate opens. If either one of the signals does not correspond to the other, the gate remains closed and the signals do not pass for processing.

One object of the present invention is to discriminate light responsive characteristics of stained biological cells from spurious light induced noise.

Another object of the present invention is to provide dual parameter analysis of biological cells.

One advantage of the present invention is that in accordance therewith, spurious signals and noise are substantially eliminated from photometric outputs.

Another advantage of the present invention is that in accordance therewith, dual parameter outputs from cellular photometric analysis are checked against one another to effectively eliminate spurious light induced noise.

BRIEF DESCRIPTION OF THE DRAWING

Other objects and advantages of the present invention will be apparent to those skilled in the art from the following description with reference to the appended claims wherein like numbers denote like parts and wherein:

DETAILED DESCRIPTION OF THE INVENTION

Figure 1:
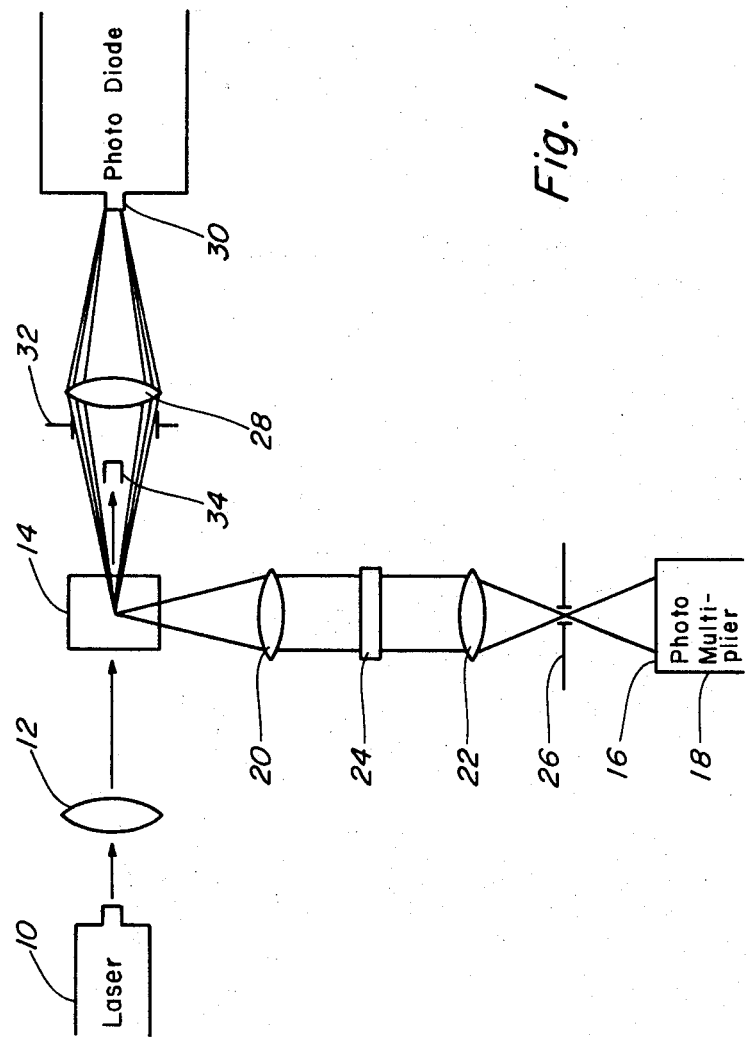
FIG. 1 illustrates an apparatus in accordance with the invention for generating dual parameter light outputs for detection.

Reference is now made to FIG. 1 which illustrates an exemplary embodiment of the optical apparatus in accordance with the invention. A laser 10, preferably an argon ion laser operating at 4.88 millimicrons (m$\mu$), serves as a light source. The beam from laser 10 passes through a preferably 20 centimeter focal length lens 12 which focuses it to a 50 micron ($\mu$) spot at the center of a laminar flow chamber 14. A chamber suitable for use with the invention herein is described in U.S. Pat. No. 3,710,933 to Fulwyler et al. issued Jan. 16, 1973. Other chambers well known to those skilled in the art providing laminar flow through a narrow chamber are also suitable. Appropriately stained biological cells flow, preferably individually, from a source (not shown) through the flow chamber and thereby through the focused beam of light from laser 10.

These cells carry a dye as aforementioned in the background of the invention. Each cell crossing the beam from laser 10 scatters some of the light incident thereon and also fluoresces in response to the light stimulation of the beam. Both the scattering and fluorescence occur simultaneously and are related to the position and time of the cell within the beam. The light fluoresced by the cell is emitted in all directions but is preferably collected on the surface of a photomultiplier tube disposed substantially at a 90° angle to the direction of the laser beam incident on the cell. As shown in the figure, an input face 16 of a photomultiplier tube 18 receives light fluoresced from a cell within the beam 10 through, for example, optics comprising two $f/1.6$ lenses 20 and 22, a barrier filter 24 which passes light of the desired fluorescent wavelength and attenuates light of undesirable wavelengths such as other fluorescent wavelengths and wavelengths present in the beam produced by laser 10, and a pinhole in a mask 26 located at the focal point of lens 22. Photomultiplier tube 18 produces an electrical signal in accordance with the intensity of any fluoresced light received on its face 16. The pinhole in mask 26 functions as a spatial filter. It ideally is on the order of 300 microns in diameter, is preferably from about 200 to 400 microns, but can be from about $50\mu$ to at least $600\mu$ in diameter.

Barrier filter 24 prevents scattered light from entering the detector 18. Filter 24 is selected to optimize the emission spectrum for the particular fluorescent dye in use.

At the same time a cell within beam 10 fluoresces light in response to stimulation from the beam, it scatters light from the beam. Light scattered within, preferably, approximately 0.6 to 1.8° from the direction of the beam in the forward direction is collected by a 15 centimeter lens 28 and focused by the lens onto a photodiode 30 connected to appropriate electrical circuitry. The photodiode 30 produces an electrical signal related to the intensity of the light collected thereby. Outer and inner beam stops 32 and 34, respectively, provide collection of light scattered within the range indicated. These beam stops shut out all scattered light outside the range desired as well as light passing through the partially transmitting cell which would fall on photodiode 30.

Figure 2:
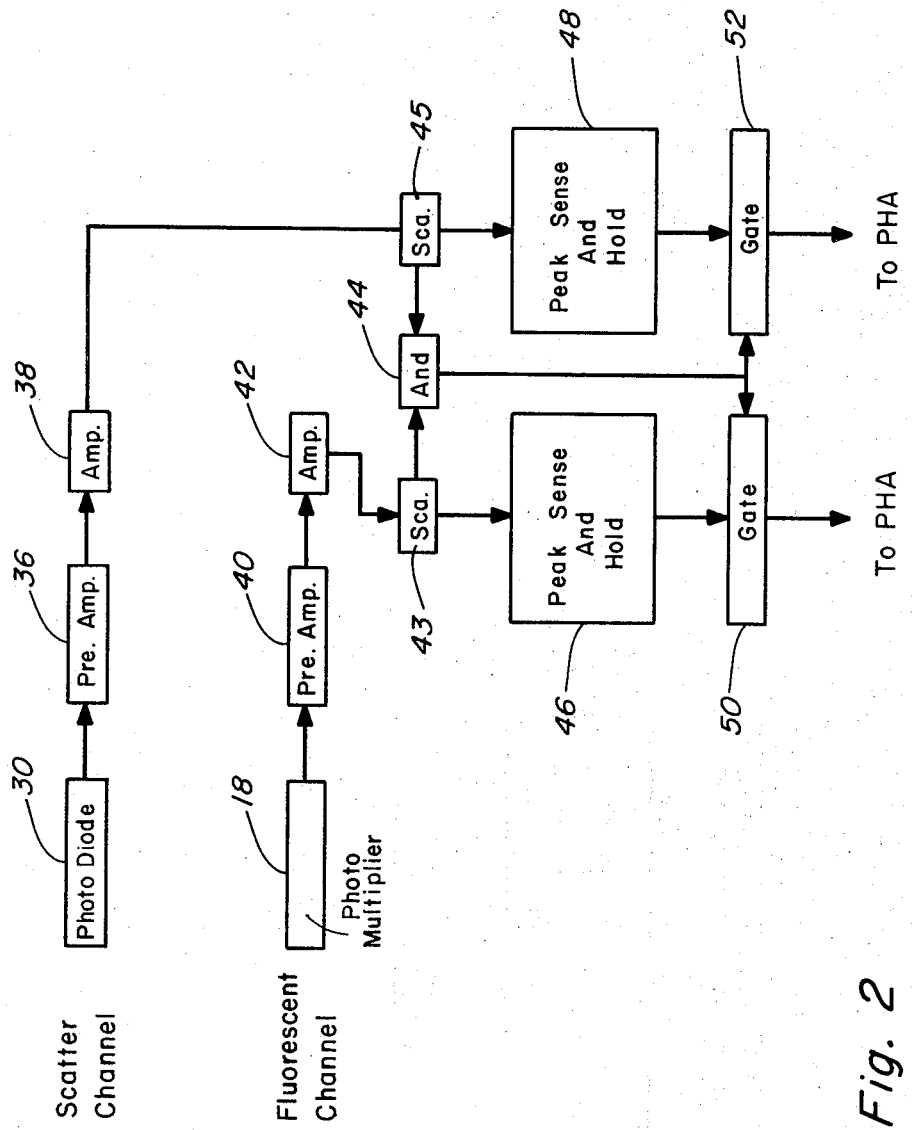
FIG. 2 schematically shows electronic circuitry in accordance with the invention for electronically analyzing at least two light responsive characteristics detected by the detectors shown in FIG. 1.

FIG. 2 schematically shows electrical circuitry for processing at least two light responsive characteristics of the cell. Two detectors, 18 and 30, receive fluoresced and scattered light, respectively. Detector 30 outputs through normalization circuitry preferably comprising a preamplifier 36 and an amplifier 38. Detector 18 also outputs through normalization circuitry preferably comprising a preamplifier 40 and an amplifier 42. The signals from detectors 18 and 30, if simultaneous, pass through single channel analyzers 43 and 45, respectively, and then through an AND gate 44. If a spurious light induced signal enters either detector to appear at AND gate 44, it will not pass through the gate to output. Properly gated pulses from detectors 18 and 30 pass through gated peak sense and hold circuits 46 and 48 linear gates 50 and 52, respectively, to output to a pulse height analyzer or other such readout device. In the FIG. 2 embodiment, the output of AND gate 44 gates the output of the gated peak sense and hold circuits 46 and 48 at linear gates 50 and 52. However, what particular gating or signal processing logic circuitry used is a matter of choice to those skilled in the art.

Therefore, in practicing the invention, scattering and fluorescent signals pass through separate single channel analyzers for selection of the pulse amplitude range of interest. Next, the scattering and fluorescent pulses are tested for coincidence to insure that they arose from the same cell. If both tests are positive, the linear gates open and the pulses of interest are subjected to pulse height analysis or signal processing.

A particularly useful application of the apparatus and method described herein is in the analysis of fluorescence signals from weakly stained cells. Typically, on the order of $5 \times 10^4$ cells per minute pass through the photometer, with each cell taking about 10 microseconds to cross the beam. The total time the cells spend in the beam is then about $5 \times 10^{-1}$ second out of every minute with the photometer duty cycle being about 0.83 percent. The remaining 99.17 percent of the time, the photodetectors are measuring any signals that may be caused by non-cellular material which is of no interest. Such signals are termed spurious or noise. In the case of weakly fluorescing cells, fluorescent noise may be generated from, for example, stained cellular debris or fluorescent dye which may be in solution in the cell-suspending medium.

Figure 3:
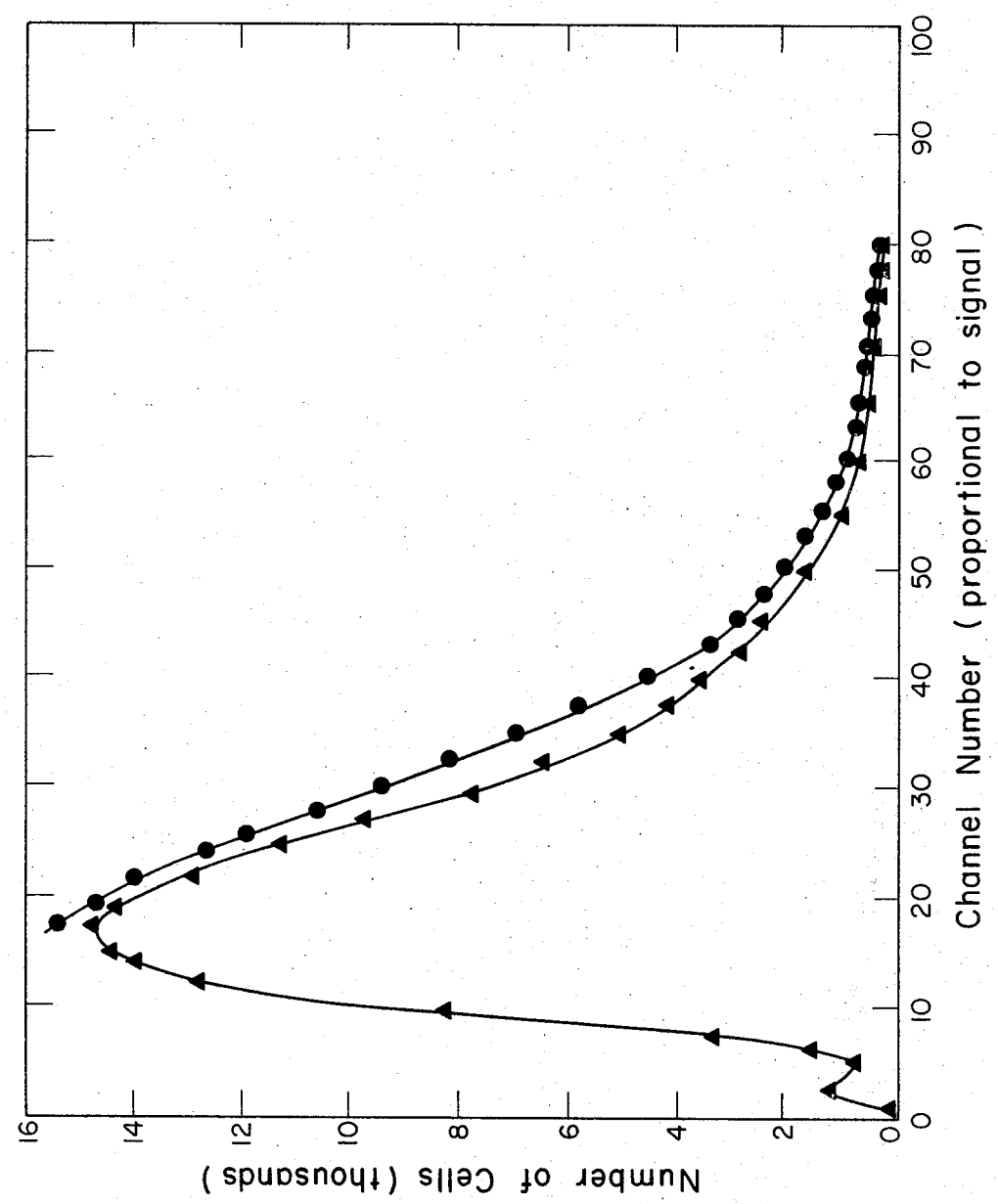
FIG. 3 shows a comparison of the outputs of a dual parameter photometric apparatus operated in accordance with the invention with the output of a photometric apparatus operated without the invention.

FIG. 3 shows fluorescence distribution obtained from Chinese hamster ovary (CHO) cells stained with $10^{-9}M$ acridine orange. When the dual parameter flow microphotometer operates as a single parameter fluorescence photometer, one obtains the upper curve (-0-0-) which has the appearance of exponential decay typical of a noise spectrum. Any signal present is overwhelmed by noise such as from the aforementioned sources. However, when the light scattering signal gates the fluorescence signal, one obtains the lower curve (-$\Delta$-$\Delta$-). Here, only signals representative of fluorescence of objects in the size range of the cells can output for analysis.

Blue light from an argon laser is suitable for excitation of many fluorescent dyes of biological interest. Cells illuminated by this light produce good light scattering and fluorescence pulses when appropriately stained. Using staining techniques, one may measure, for example, the DNA content of cell populations, the presence of virus infected cells through the use of fluorescent antibody techniques and the protein content of various tissue culture cells. Quantitative DNA distributions provide for distinguishing tumor cells from normal cells and tumor material, and for the determination of radiation effects on tumor cells subjected to irradiation. DNA measurements are also useful in life cycle analysis and drug effect studies.

Acridine orange staining permits verification of a crude white blood cell differential method and parasite identification in red blood cells.

For the acridine orange application, light emerging through the pinhole in mask 26 strikes the photocathode 18 comprising a red sensitive photomultiplier tube such as an RCA Model 4526 or RCA Model C 7164 R. The photodiode 30 may be a United Detector Technology Model PIN-040B or its equivalent. The inner beam stop 34 may comprise a cylindrical shield approximately 4 mm in diameter and located 180 mm from the center of the flow chamber 14. This particular inner beam stop produces a minimum detectable scattering angle of about 0.7°. The outer beam stop may comprise an 11 mm diameter opening providing an upper scattering range limit of approximately 2°. Neutral density filters may be placed between lens 28 and photodiode 30 to attenuate the intensity of the scattered light received.

Since the optical pulses in the beam are of short duration, i.e., less than about 10 microseconds, and are generated as the cells sweep across a light beam of dimensions equal to or less than the dimensions of the cell, the signal must undergo some electronic integration. Integration can be accomplishable in at least two ways. One may use an RC coupled amplifier with integration and differentiation time constants selected to be compatible with the pulse rise time and duration or one may use DC coupled amplifiers followed by active electronic integration.

The filter 24 may comprise a Corning glass filter No. 30-70 for 457 - or 476 nm excitation or No, 3-69 for 488 nm excitation to block the scattered light.

The laser beam may be elliptically shaped so that each cell is illuminated in the same way and so that any stream wander effects are eliminated. For example, the major axis of the ellipse may have a full width at half the maximum light intensity of about 100 microns while the minor axis of the ellipse has a full width at half the maximum intensity of about 7.5 microns. These dimensions are appropriate for the major and minor axes with a 20 centimeter focal length cylindrical lens 12 disposed 20 centimeters from the cell stream in the flow chamber 14 and a 2 centimeter focal length cylindrical lens focused onto the cell stream (not shown). The 20 centimeter lens 12 is slightly defocused to increase the major axis dimension.

The processed signals can be displayed as pulse-amplitude distribution histograms using a 2048 channel multichannel pulse height analyzer system such as Northern Scientific Model 636.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. Photometric apparatus for measuring scattering and fluorescence exhibited by appropriately stained biological cells in a solution in response to illumination thereof with high intensity light and for discriminating said fluorescence from spurious fluorescence in the solution carrying the cells, said apparatus comprising:

means for producing a high intensity light beam;

means for passing said cells through said beam to cause said cells to scatter light in said beam and to fluoresce in response to illumination from said beam, wherein the cells pass one by one through said beam and wherein said beam is focused on said cells as a spot having a diameter of from 40 $\mu$ to 60 $\mu$;

means for detecting at least a portion of said scattered light and at least a portion of said fluoresced light and for producing simultaneous first and second electrical signals representative of said detected portions, wherein said detecting means comprises means for receiving said fluoresced light at approximately a 90° angle from the direction of said light beam and means for receiving said scattered light within a range of from about 0.6° to about 1.8° to the longitudinal axis of said light beam; and means for normalizing said signals and for comparing said signals to one another to produce an output signal representative of coincident portions of the signals.

* * * * *